(12) United States Patent
Bartels et al.

(10) Patent No.: US 7,909,974 B2
(45) Date of Patent: Mar. 22, 2011

(54) LAYER COMPOSITION OF AN ELECTROWETTING SYSTEM

(75) Inventors: Frank Bartels, Hattingen (DE); Andriy Bitman, Dortmund (DE); Dieter Jerosch, Bad Soden (DE)

(73) Assignee: Advanced Display Technology AG, Appenzell (CH)

( * ) Notice: Subject to any disclaimer, the term of this patent is extended or adjusted under 35 U.S.C. 154(b) by 0 days.

(21) Appl. No.: 12/450,824

(22) PCT Filed: Apr. 21, 2008

(86) PCT No.: PCT/EP2008/003176
§ 371 (c)(1),
(2), (4) Date: Feb. 23, 2010

(87) PCT Pub. No.: WO2008/128738
PCT Pub. Date: Oct. 30, 2008

(65) Prior Publication Data
US 2010/0165441 A1 Jul. 1, 2010

(30) Foreign Application Priority Data
Apr. 21, 2007 (DE) .................. 10 2007 018 959

(51) Int. Cl.
*C02F 1/40* (2006.01)
*B03C 5/02* (2006.01)
*B29C 65/00* (2006.01)
*G02B 26/02* (2006.01)

(52) U.S. Cl. ......... 204/600; 204/601; 204/660; 204/672; 156/349; 359/228

(58) Field of Classification Search .................. 156/349; 204/600, 601, 660, 672; 359/228
See application file for complete search history.

(56) References Cited

U.S. PATENT DOCUMENTS

| 5,812,158 A | 9/1998 | Murthy et al. |
| 6,911,132 B2 * | 6/2005 | Pamula et al. ................ 204/600 |
| 6,992,881 B2 | 1/2006 | Reichert et al. |
| 7,172,947 B2 | 2/2007 | Li et al. |

(Continued)

FOREIGN PATENT DOCUMENTS

EP 0 785 073 B1 11/2001

(Continued)

OTHER PUBLICATIONS

Maura Jenkins et al; Studies of Silane Adhesion Promoters on Silica Filler Particles for use in Microelectronic Packaging; Materials Research Society Symposium.

(Continued)

*Primary Examiner* — Evelyn A. Lester
(74) *Attorney, Agent, or Firm* — Marshall & Melhorn, LLC

(57) ABSTRACT

A layer composition of an electrowetting system with a first electrode layer, an insulator layer on the first electrode layer, and a fluid layer over the insulator layer, wherein the fluid layer comprises at least two immiscible fluids which, under the influence of an applied voltage, reversibly change their wetting behavior of a surface allocated to the insulator layer, wherein the insulator layer being at least in part built of a material with a permittivity of $\in_r \geq 20$. The fluid layer is adjacent to at least one layer being repellent for the at least one of the fluids. On the surface of the repellent layer pointing away from the fluid layer is provided an adhesion enhancing layer before the subsequent layer.

6 Claims, 1 Drawing Sheet

U.S. PATENT DOCUMENTS

| | | | |
|---|---|---|---|
| 7,255,780 B2 * | 8/2007 | Shenderov | 204/600 |
| 7,298,559 B2 | 11/2007 | Kato et al. | |
| 7,569,129 B2 * | 8/2009 | Pamula et al. | 204/600 |
| 2006/0021875 A1 * | 2/2006 | Griffith et al. | 204/601 |
| 2007/0246365 A1 * | 10/2007 | Ohishi et al. | 204/601 |
| 2008/0231964 A1 | 9/2008 | Tijburg et al. | |
| 2008/0264797 A1 * | 10/2008 | Pamula et al. | 204/600 |
| 2008/0297880 A1 | 12/2008 | Steckl et al. | |
| 2010/0134861 A1 * | 6/2010 | Ohishi et al. | 359/228 |

FOREIGN PATENT DOCUMENTS

| | | |
|---|---|---|
| EP | 1 708 006 A1 | 10/2006 |
| WO | WO 01/99130 A1 | 12/2001 |
| WO | WO 2006/017129 A2 | 2/2006 |
| WO | WO 2007/034377 A2 | 3/2007 |

OTHER PUBLICATIONS

Proceedings; Materials Research Society, Pittsburg, Pennsylvania, USA; vol. 710, Nov. 26, 2001; pp. 159-164; XP008037515.

Wu Jiangang et al; Design, Simulation and Fabrication of Electrowetting-Based Actuators for Integrated Digital Microfluidics; 2006 1st IEEE International.

Conference on Nano/Micro Engineered and Molecular Systems (IEEE Cat No. 06EX129PC), Piscataway, NJ, USA; pp. 1097-1100 (4 pp); XP002487679.

Johan Feenstra and Rob Hayes; Electrowetting Displays; Liquavista; Jan. 2006; Liquavista BV.

* cited by examiner

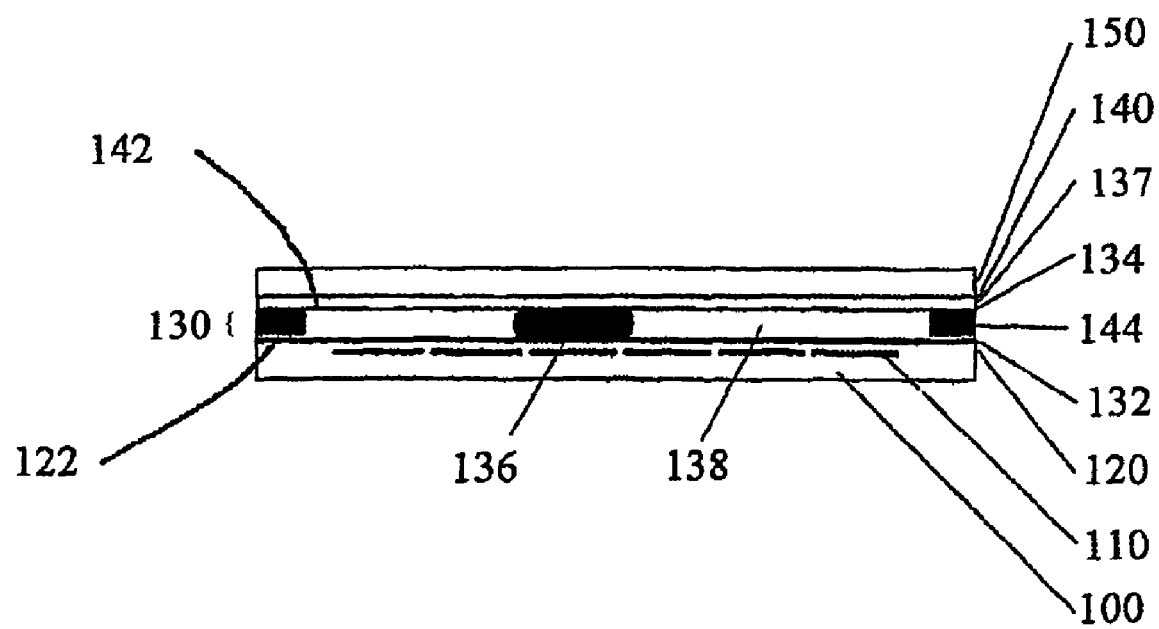

LAYER COMPOSITION OF AN ELECTROWETTING SYSTEM

BACKGROUND OF THE INVENTION

The invention relates to the layer composition of an electrowetting system with a first electrode layer, an insulator layer on the first electrode layer, and a fluid layer above the insulator layer, with the fluid layer comprising at least two immiscible fluids which, under the influence of an applied voltage, reversibly change their wetting behavior of a surface allocated to the insulator layer.

Such a layer composition is described in the article "Electrowetting Displays" by Johan Feenstra and Rob Hayes, accessible under
http://www.liquavista.com/files/LQV060828XYR-15.pdf.

Electrowetting describes a procedure to modify the form of a fluid, or to change its position, by applying an electrical field. The form of a drop is determined by its surface tension relative to the adjacent media. The surface tension is an effect of the associated surface energies, which, in the case of electrowetting, are influenced by an electrostatic contribution. This relationship is described by the Young-Lippmann equation $$\gamma_{LV}\cos\theta = \gamma_{SV} - \gamma_{SL} + (1/2)(\epsilon_0\epsilon_r/d)V^2$$

with $\gamma_{LV}$, $\gamma_{SV}$ and $\gamma_{SL}$ as well as $\epsilon_r$ being material constants, so that angle $\theta$ that defines the tangent of a drop at the interface with a solid base is changed when voltage V is changed, and $\epsilon_r$ being regarded as predefined by the fluid(s).

In the first electrode layer, various variants of electrode configurations may be arranged, depending on whether only the contour of the drop should be modified, whether the position of the drop should be changed through structured electrodes, or whether a combination of both effects is desired.

In the known layer compositions, materials with good insulating properties and high dielectric strength are used as insulating layer. The above mentioned article proposes glass, i.e. $SiO_2$.

The invention is based on the finding that not only the materials of the fluid, but also other portions contribute to the Young-Lippman equation.

The voltage applied to the electrowetting system distributes differently onto the various areas. The overall behavior can be described as a surrogate circuit diagram with a serial connection of capacitances. The voltage partly drops at the fluid drop, partly at the wetted interface with the insulator and, if provided, also at a cover electrode. However, due to the high permittivity of the used fluids the voltage drop over the drop height is comparatively small. Thus, in known electrowetting systems, the field is applied mainly to the insulator layer over the electrodes.

For a satisfactory electrowetting effect, field strengths of approximately 70% of the dielectric strength are required. Very small irregularities in the thickness then result in the drop, inducing a field breakdown with corresponding destruction when it reaches such a site. A thicker insulator layer, as may be usually used in such cases, is not helpful in this case, as by increasing the layer thickness the field portion in the area of the drop decreases significantly. This again makes it necessary to increase the voltage, which again approximates the field at the insulator layer to the dielectric strength.

BRIEF SUMMARY OF THE INVENTION

According to the invention, it is therefore envisaged that the insulator layer is built, at least in parts, of a material with a permittivity of $\epsilon_r \geq 20$. By this, the field portion, dropping over the insulator layer, is reduced, and simultaneously, the charge carrier concentration at the drop interface is increased. Further material properties are based on the intended purpose of use of the electrowetting system. For example, if it is used in a display, the insulator layer should comprise transparent materials.

When selecting the materials, it should further be kept in mind that they should at the same time have a high dielectric strength. It has been found that eligible materials are metals or metal oxides from group IIIB through VIB of the transition elements of the periodic table, being materials that are also used for production of capacitors and chips. They are also known as high k materials.

A good overview over suitable materials can be found in WO 01/99130 A1 that specifically compares tantalum ($\epsilon_r \sim 27$) and niobium ($\epsilon_r \sim 42$) and proposes to improve the properties of niobium with, in the case of capacitors, an alloy or doping at least of the boundary layer with vanadium, showing clearly improved properties.

A further approach to provide materials with high permittivities is described in U.S. Pat. No. 7,172,947 B2. There, the eligible materials or metal oxides are doped with a non-metal, preferably with nitrogen. The permittivity increase thus achieved is thought to be due to the conversion of the initial crystal structure into a mainly tetragonal crystal structure. This makes it possible to increase the permittivity value by more than 45%.

The properties of a second or further fluid(s) may contribute as well to the electrowetting effect. Usually, water with a permittivity $\epsilon_r$ of approximately 78 is used as the fluid layer. Alternatively propylene carbonate and γ-butyrolactone may be used, also being colorless fluids. Furthermore, they advantageously have a melting temperature of −43° C., so that displays working with the electrowetting effect may also be used in cold regions where water with its melting temperature of 0° C. would already cause the failure of the device. For this, propylene carbonate is specifically preferred, although its permittivity with $\epsilon_r \sim 65$ is considerably higher than the permittivity of γ-butyrolactone with $\epsilon_r \sim 36$.

By optimization of the materials for the individual components of the layer composition, the voltage can be considerably reduced, whilst maintaining the performance of the electrowetting effect, or the respective performance data may be improved when the voltages are increased. Using niobium oxide as the insulator layer, for example, the performance of the electrowetting effect could be maintained when the voltage is decreased from 60 V to 12 V.

However, especially if a drop is to be moved, in most of the applications the optimization of the dielectrics is not sufficient, since the binding forces keeping the drop attached to the surface must be as small as possible. Therefore, it is intended that the fluid layer adjoins at least one layer that is repellent for at least one of the fluids. It has been shown that the repellent layer for water as the fluid is advantageously an amorphous fluoropolymer layer, with a polytetrafluoroethylene which is sold by Dupont under the name of TEFLON AF being specifically suited. WO 2006/017129 discloses a layer composition wherein the hydrophobic insulator may be comprised of a fluoropolymer such as TEFLON AF or of a dielectric material such as $SiO_2$, $Al_2O_3$, $BaTiO_3$ and may include a molecular monolayer of a hydrophobe material.

WO 2007/034377 A2 relates to a fluid focus lens and discloses a layer composition wherein an adhesion-improving metal layer is arranged as an intermediate layer between a substrate and an electrically insulating layer. According to one embodiment, the layer which is in contact with the fluid, is comprised of TEFLON AF 1600 and is in contact with the electrically insulating layer on an opposite side of the intermediate metallic layer.

U.S. Pat. No. 7,172,947 B2 relates to a transition metal oxide dielectric material that is doped with a non-metal in order to enhance the electrical properties of the metal oxide. As dopant is proposed nitrogene.

Tests with TEFLON AF as a hydrophobic layer revealed that a bond between the TEFLON layer and the dielectric that has a stable adhesion cannot be obtained and the hence the durability of the layer system is essentially limited.

Therefore, it is the object of the invention to provide a layer composition of an electrowetting system whose performance and service time are enhanced.

According to the invention, this object is solved by a layer composition of an electrowetting system according to claim 1.

By preferably applying an adhesion enhancing layer, the repellant layer is applied to the insulating layer with a sound bonding being obtained.

If a cover electrode is to be used, as it is in most cases, the repellent layer is to be fixed adhesively to the cover electrode and to the insulator layer, as otherwise the lifetime of the layer system is considerably reduced.

According to one embodiment, the adhesive layer comprises $Si_nH_{2n+2}$ or $Si_nH_{2n}$ or a mixture of these or derivatives of these.

BRIEF DESCRIPTION OF THE DRAWINGS

In the following, the invention will be described further by use of the accompanying drawings, with the single drawing FIGURE showing an optimized layer composition in an electrowetting system according to an embodiment of the present invention.

DETAILED DESCRIPTION OF THE INVENTION

If in the description, a layer is described as being "on" another layer, it is meant to be directly adjacent to it. If a layer is arranged "over" another layer, one or more layers may be interposed.

According to the drawing FIGURE, the layer system is built of cells, each having a carrier 100 made of a transparent insulating material. Therein, the thickness of the carrier 100 is based on the expected mechanical stresses or the intended use with the minimum thickness possibly being 5 μm, and the maximum thickness several millimeters. On the carrier 100, an electrode layer 110 is disposed the structuring of which is chosen according to the intended embodiment. On the electrode layer 110, an insulator layer 120 is disposed which is made of a material with a high permittivity of at least 20 according to the invention. Over the insulation layer 120, a repellent layer 132 is disposed, with an interposed adhesion enhancing layer 122 providing good adhesion of the repellent layer 132 to the composition. This bottom section is supplemented by a top section comprised of a cover carrier 150, a cover electrode 140, another adhesive layer 142 and another repellent layer 134. Under the cover electrode 140, an insulator layer 137 may be disposed which may also, according to the invention, have a permittivity $\in_r \geq 20$, but not necessarily. The bottom and top sections form a sandwich around a fluid layer 130 which contains two fluids 136, 138 that are immiscible. A resist 144 along the periphery of the cell provides the fluid-tight termination of the fluid layer 130.

Materials and dimensions of the individual layers of the layer composition are summarized in the following table 1.

TABLE 1

| Layer | Material | Minimum Thickness | Maximum Thickness |
|---|---|---|---|
| Carrier 100 | Insulator/transparent | 5 μm | Several mm |
| Electrode layer 110 | ITO oxide | 30 nm | 1 μm |
| Insulator layer 120 | High K material (niobium oxide) | 100 nm | 5 μm |
| Adhesive layer 122 | Silane | 1 atom layer | 100 nm |
| Repellent layer 132 | Teflon AF | 10 nm | 5 μm |
| Fluid layer 130 | Water, propylene carbonate, etc. | 10 μm | 200 μm |
| Repellent layer 134 | Teflon AF | 10 nm | 5 μm |
| Adhesive layer 142 | Silane | 1 atom layer | 100 nm |
| Cover electrode 140 | ITO oxide | 30 nm | 1 μm |
| Cover carrier 150 | Insulator | 5 μm | Several mm |

A summary of the properties of several fluids that may be used in the fluid layer 130 is given in table 2.

TABLE 2

| Properties | Water | Propylene carbonate | γ-Butyrolactone |
|---|---|---|---|
| Color | Colorless | Colorless | Colorless |
| Dynamic viscosity | 1 mPa*s | 2.8 mPa*s | 1.92 mPa*s |
| Melting temperature | 0° C. | −43° C. | −43° C. |
| Boiling temperature | 100° C. | 243° C. | 201-206° C. |
| Density | 1 g/cm³ | 1.20 g/cm³ | 1.128 g/cm³ |
| Permittivity | 78 | 65 | 36 |

The features of the invention that are disclosed in the previous description, in the drawing as well as in the claims, may be individually as well as in any combination essential for the realization of the invention.

The invention claimed is:

1. A layer composition of an electrowetting system, comprising
   a first carrier made of a transparent insulating material;
   a first electrode layer disposed over the first carrier;
   an insulator layer over the first electrode layer being built, at least in parts, of a material with a permittivity of $\in_r \geq 20$;
   a first repellent layer over the insulator layer that is repellent for at least one fluid that adjoins to the repellent layer;
   a fluid layer on the first repellent layer, wherein the fluid layer comprises at least two non-mixable fluids which, under the influence of an applied voltage, reversibly change their wetting behavior towards a surface of the first repellent layer; and
   a second repellent layer disposed over
   a first adhesive layer disposed over
   a second electrode layer disposed over
   a second carrier;
   wherein the first carrier, the first electrode layer, the insulator layer and the first repellent layer form a first section, and the second repellent layer, the first adhesive layer, the second electrode layer and the second carrier form a second section, with the first and second section forming a sandwich around the fluid layer,
   wherein a second adhesive layer is disposed between the insulator layer and the first repellent layer, and
   wherein the adhesion enhancing layer comprises $Si_nH_{2n+2}$ or $Si_nH_{2n}$ ($n \geq 1$) or a mixture thereof.

2. The layer composition according to claim 1, wherein the material with a permittivity of $\epsilon_r \geq 20$ comprises at least one metal or metal oxide from the groups IIIB to VIB of the transition elements.

3. The layer composition according to claim 2, wherein the metal or metal oxide is doped with a non-metal.

4. The layer composition according to claim 1, wherein the fluid layer comprises water, propylene carbonate or γ-butyrolactone.

5. The layer composition according to claim 1, wherein at least one of the repellent layers is an amorphous fluoropolymer layer.

6. The layer composition according to claim 3, wherein the metal or metal oxide is doped with nitrogen.

* * * * *